Figure 3:
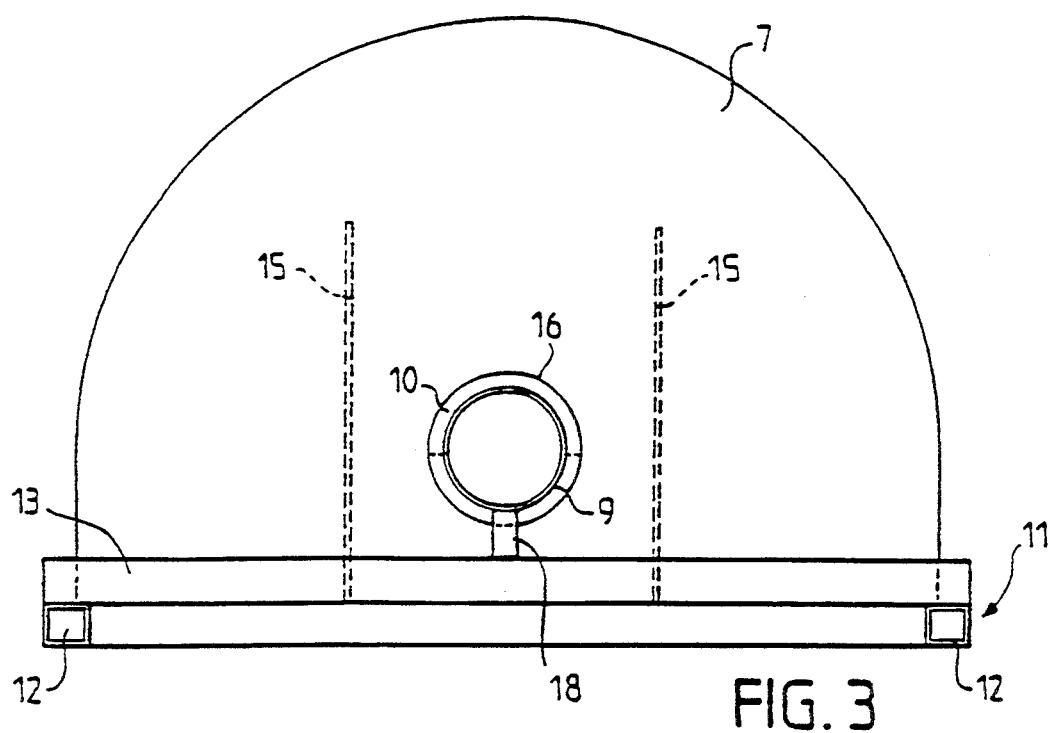
Figure 4:
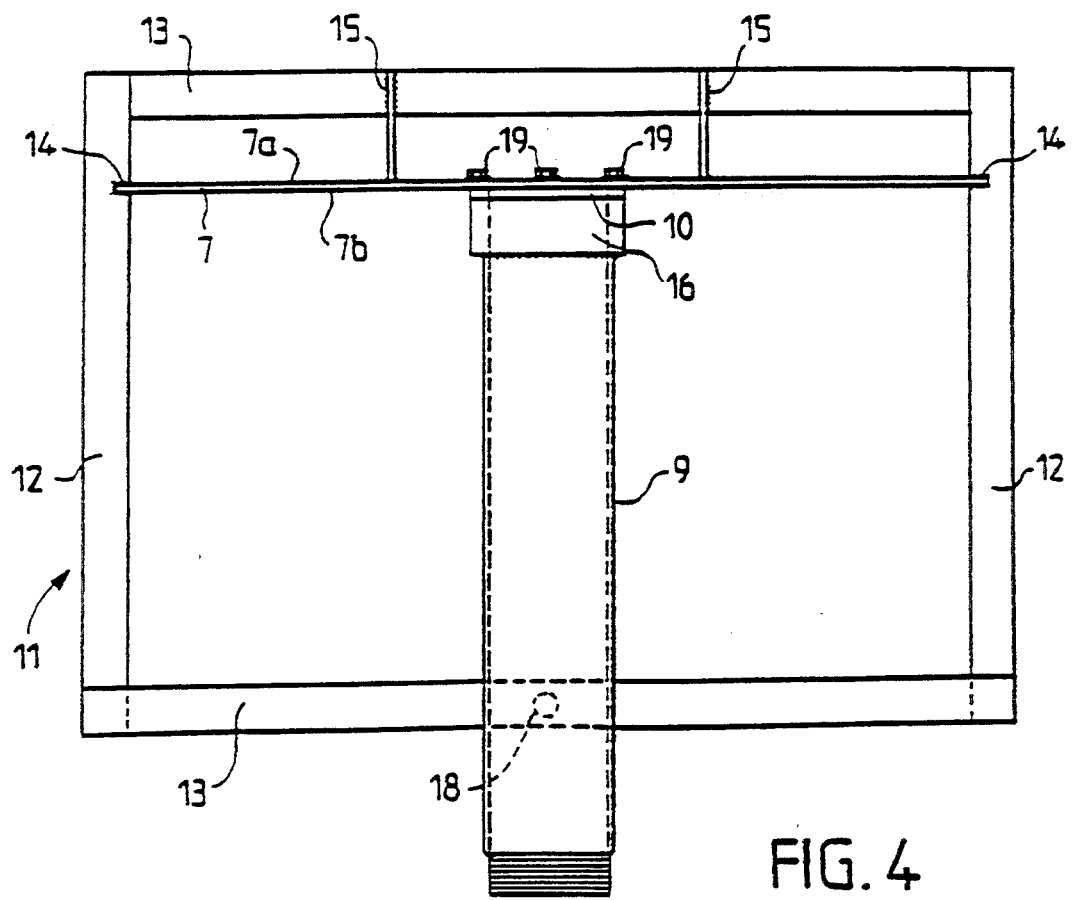
Figure 5:
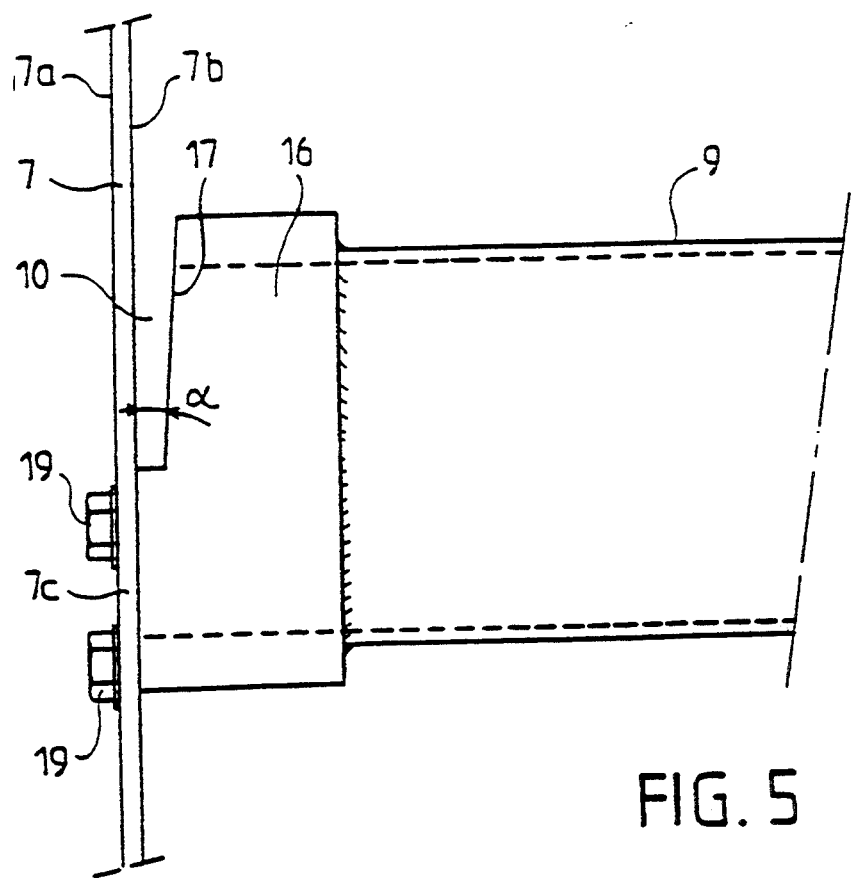
Figure 6:
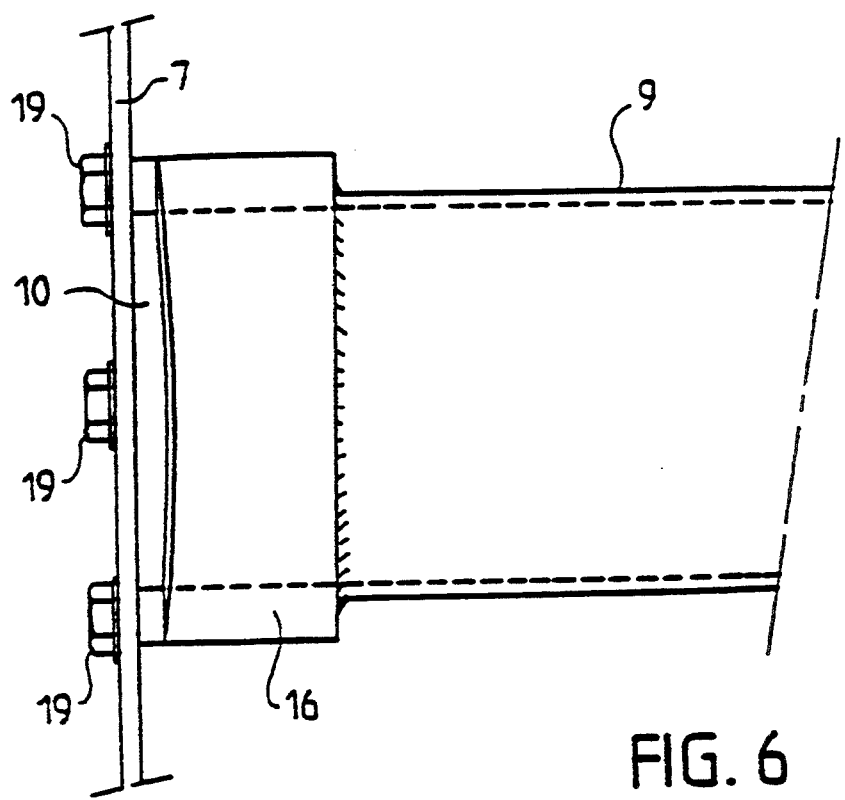

United States Patent [19]

Formhals et al.

[11] Patent Number: 5,445,322

[45] Date of Patent: Aug. 29, 1995

[54] APPARATUS FOR PROJECTING WATER TO FORM AN INSUBSTANTIAL SCREEN FOR RECEIVING IMAGES

[75] Inventors: Dominique Formhals, Furdenheim; Yves Pepin, Neuilly sur Seine, both of France

[73] Assignee: Aquatique U.S.A., Baltimore, Md.

[21] Appl. No.: 327,446

[22] Filed: Oct. 21, 1994

Related U.S. Application Data

[63] Continuation of Ser. No. 57,369, Apr. 30, 1993, abandoned, which is a continuation-in-part of Ser. No. 736,570, Jul. 26, 1991, abandoned.

[30] Foreign Application Priority Data

Jul. 30, 1990 [FR] France .................. 90 09704

[51] Int. Cl.$^6$ ............... B05B 17/08'1/04; B05B 1/26
[52] U.S. Cl. ..................... 239/18; 239/275; 239/521; 239/590.5; 359/443
[58] Field of Search ............ 239/17, 18, 19, 20, 239/22, 23, 273, 275, 280, 521, 590.5; 359/443

[56] References Cited

U.S. PATENT DOCUMENTS

| | | | |
|---|---|---|---|
| Re. 25,447 | 9/1963 | Hjulian | 239/590.5 |
| 620,592 | 3/1899 | Just | 239/18 |
| 1,446,266 | 2/1923 | Murray | 359/443 |
| 1,631,240 | 6/1927 | Amet | 359/443 |
| 2,627,439 | 2/1953 | Wornall | 239/590.5 |
| 2,956,751 | 10/1960 | Burque et al. | 239/521 |
| 3,069,100 | 12/1962 | Schuler | 239/522 |
| 3,109,593 | 11/1963 | Newland, Sr. | 239/275 |
| 3,252,661 | 5/1966 | Aldrich | 239/515 |
| 3,334,816 | 8/1967 | Mizuno | 239/18 |
| 4,974,779 | 12/1990 | Araki et al. | 239/18 |
| 5,067,653 | 11/1991 | Araki et al. | 239/18 |

FOREIGN PATENT DOCUMENTS 59-192237 10/1984 Japan .
1412817 7/1987 U.S.S.R. .

*Primary Examiner*—Andres Kashnikow
*Attorney, Agent, or Firm*—Jacobson, Price, Holman & Stern

[57] ABSTRACT

An apparatus projects water under pressure to form a screen (1) made of transparent droplets (2) that can reflect rays of light (3) striking the screen by back-projection (4). It includes a substantially vertical dispersal plate (7) that is disposed on the trajectory of the water driven substantially without swirling by a high-pressure pump (8) in a substantially horizontal conduit (9), the end of which is mechanically joined to the dispersal plate (7) and with it defines an upper opening (10) providing an outlet for a vertically oriented sheet of water. The invention is applicable to projection apparatus for sound and light shows.

21 Claims, 4 Drawing Sheets

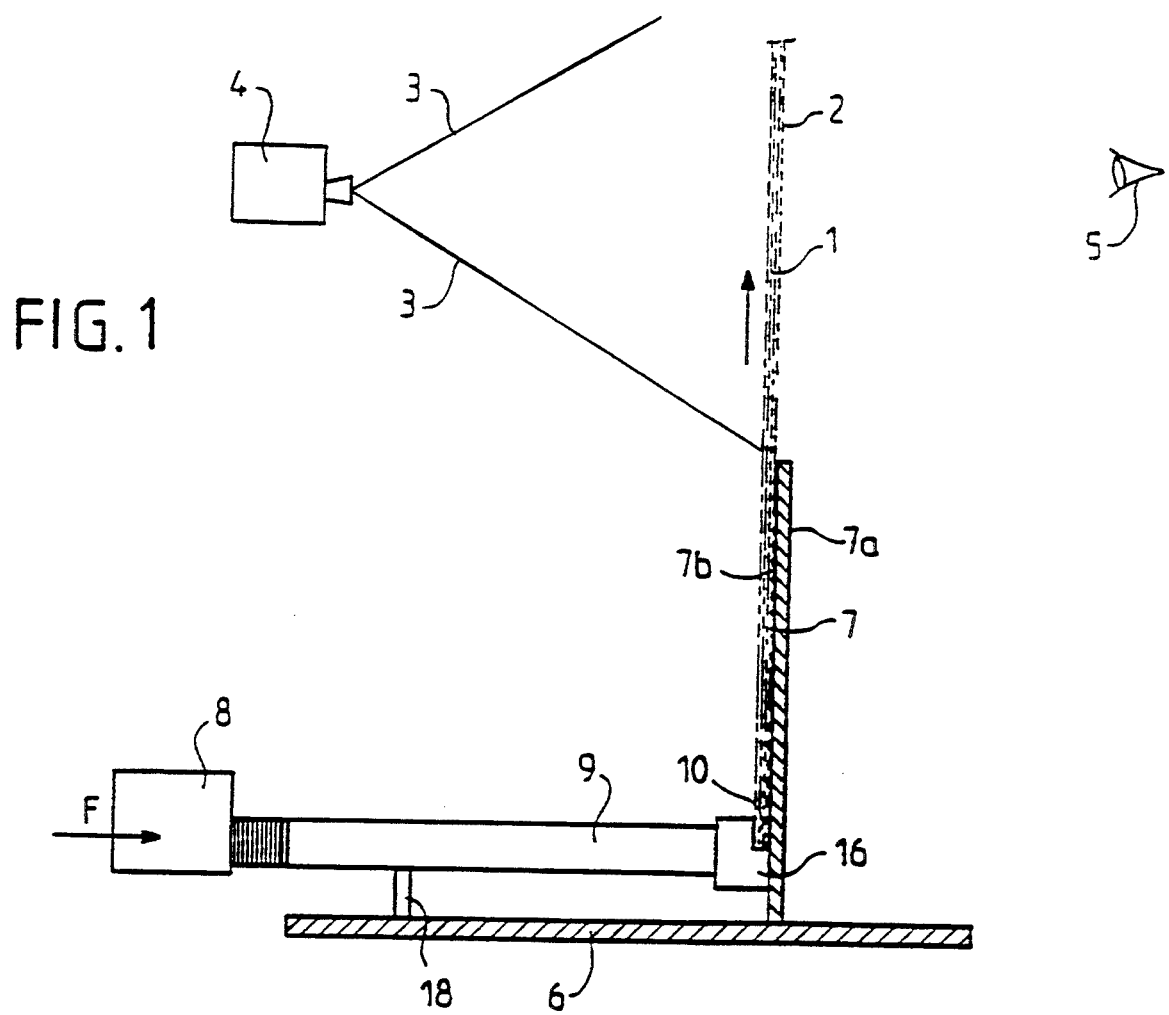

APPARATUS FOR PROJECTING WATER TO FORM AN INSUBSTANTIAL SCREEN FOR RECEIVING IMAGES

RELATED APPLICATION

This application is a continuation of application Ser. No. 08/057,369, filed Apr. 30, 1993, now abandoned which is a continuation-in-part application of application Ser. No. 07/736,570, filed Jul. 26, 1991, also abandoned.

FIELD OF THE INVENTION

The present invention relates to an apparatus for projecting water under pressure to form a screen, made up of transparent droplets that are capable of reflecting the light rays striking the screen by back-projection, thus making the screen a receiver of moving or still images.

PRIOR ART

The concept of projecting images onto a water screen is not new. Such a concept is found, e.g., in U.S. Pat. No. 620, 592 (Just), issued on Mar. 7, 1899. Water played a different role in the screen of U.S. Pat. No. 1,446,266 (Murray), issued on Feb. 20, 1923. A wire-mash screen is used as a skeleton for a water screen according to U.S. Pat. No. 1,631,240 (Amet) of Jun. 7, 1927. A plurality of individual jets are used to create a back-projection screen according to U.S. Pat. No. 3,334,816 (Mizuno) of Aug. 8, 1967. A waterfall back-projection screen is the subject matter of Japanese Patent 59-192237 (Kawamura) of Oct. 31, 1984. Russian Patent 1412817 (Marii Poly) of Jul. 30, 1988, employs individual jets of water for a light-musical fountain creation. A multiple-jet water screen for image projection is also described in U.S. Pat. No. 4,974,779 (Araki) of Dec. 4, 1990, a division of which issued as U.S. Pat. No. 5,067,653 on Nov. 26, 1991.

An entirely different type of water screen, and one which is completely useless as a screen for back-projection of light images, is that which is referred to as a water curtain in firefighting. Examples of relevant apparatus for producing such water curtains are found in U.S. Pat. No. 2,956,751 (Burque), U.S. Pat. No. 3,069,100 (Schuler), U.S. Pat. No. 3,109,593 (Newland), and U.S. Pat. No. 3,252,661 (Aldrich). Each of these patents is directed to creating a water wall of substantial thickness and non-uniformity, whereas water screens for back-protection of light images must necessarily be more in the form of a film of water.

BACKGROUND OF THE INVENTION

The purpose of the subject apparatus is to create open-air shows presented at night, such as sound and light shows, without having to have a substantial screen, the use of which would in any case be incompatible with the environment in which this type of show is generally presented.

Apparatus for projecting water to form a reflective screen is known and comprises side-by-side, aligned disposition of jets of water that are obtained, for instance, from a distributor in which the water, under pressure and spurting through output nozzles, is placed; the nozzles communicate with the interior of the distributor and correspond in number to the number of water jets to be produced, which depends on the desired width of the screen. Clearly, the larger the width of the screen, the greater the loss of head, because the number of spray nozzles is multiplied, and the height of the screen is consequently proportionately lessened, unless the pressure is commensurately increased by using more powerful equipment, which necessarily increases the cost of the apparatus.

However, there is yet another disadvantage, which relates to the quality of the water screen. A screen thus obtained in fact lacks surface regularity, because it is created from a plurality of sources that drive juxtaposed jets having more or less the cross section of secants of a circle. Of course one could conceive of solving this problem by providing nozzles with specially shaped tips to create angular, flate streams of water, but the overlapping of these streams would make for irregularity in the thickness and density of the screen of water thus produced.

In fact, the major problems encountered in known apparatus have to do with the instability of the water, especially as it falls. Since it is not being moved by any specific force, it is vulnerable to any outside force, particularly the force of wind. Variations in thickness of the screen and absence of uniformity and rigidity of the masses of moving water thus lead to poor definition of images projected onto the screen, resulting in blurred contours, a lack of detail, and jumbled lines, requiring variable focusing of the lens of the image projection equipment.

SUMMARY OF THE INVENTION

Analysis of these various disadvantages and their causes has led to the conclusion that the only way to overcome them would be to achieve a screen made up of a very fine sheet of water that is generated and maintained by strong pressure.

To attain this object, the present invention relates to an apparatus for projecting water under pressure to form a screen, made up of transparent droplets that are capable of reflecting the light rays striking the screen by back-projection, thus making the screen a receiver of moving or still images, characterized in that it includes a substantially vertical dispersal plate that is disposed on the trajectory of the water driven by way of a high-pressure pump in a substantially horizontal conduit; the end of the conduit is mechanically joined to the dispersal plate and with it defines an upper opening constituting an outlet for a vertically oriented or directed sheet of water.

Naturally, the dispersal plate can have an inclination with respect to the vertical, for example of several degrees to the rear, so that the droplets will fall not in front of the projected image, but rather behind it.

In another characteristic of the invention, the dimensional and structural definition of the screen is controlled by the shape of the upper opening and by the throughput and pressure of the high-pressure pump.

This upper opening is obtained by removal of partially acted-upon material at the end of the conduit between the dispersal plate and the conduit.

In a preferred embodiment, the upper opening is semicircular in contour, made on the periphery of a cylindrical conduit, for obtaining a screen made up of droplets projected in directions that encompass an angle of 180°.

To obtain such an opening, the end of the conduit is a cylindrical nozzle that is notched along a plane radial to its upper portion and is mechanically joined in a sealed manner to the dispersal plate in its lower portion.

In a variant embodiment of the nozzle, this nozzle is notched along a plane oblique to its upper portion to form an open angle with respect to the lower portion of the dispersal plate to which the nozzle is mechanically joined in a sealed manner in its lower portion.

This kind of oblique notching in a cylindrical body produces an opening in the form of a whistle, which is located farther from the dispersal plate that forms its width in the middle upper zone than in the lateral zones.

Thus the droplets, propelled about the vertical axis, in which inertia is greater, will not be as compact, since they are more vulnerable to thrust under pressure in this median zone. This compensates for a difference in inertia there compared with the droplets originating in the lateral zones of this whistle-like opening, so that a screen that is regular in shape is obtained.

The invention, in its preferred configuration, comprises a combination of a number of different elements: the cylindrical nozzle is connected to the end of the conduit, the high-pressure pump is advantageously a turbocompressor, the number of stages of a multiple-stage pump depends on the screen size being produced, the dispersal plate and the conduit are disposed solidly joined to a stabilizer base, the stabilizer base is composed of a horizontally disposed frame between two lateral edges of which the dispersal plate is fixed, substantially perpendicularly, reinforcement ribs are disposed at right angles between the dispersal plate, on its side opposite the side receiving the splash of water, and a longitudinal edge of the frame of the stabilizer base.

An apparatus of this kind according to the invention advantageously makes it possible to obtain a substantially semicircular screen formed of a sheet of water under pressure that can attain 18 meters in height and 45 meters in width.

There are a number of different aspects to this invention:

a) A bottom-projected water screen composed of a vertically-oriented sheet of water in the form of a stable film having a substantially uniform surface, thickness and density, the depth (thickness) of the film being less than 10 cm. at mid height;

b) A combination of the bottom-projected water screen with a back-projector of moving or still light images and the light images from the projector on the screen;

c) A combination of a conduit, nozzle and a splash plate toward which the conduit and nozzle are directed, the splash plate being positioned so that water ejected from the nozzle at a sufficient velocity will be projected vertically upwardly by the splash plate to form a water screen, and the conduit having internal baffling means to counteract turbulence and/or swirling motion of water passing therethrough;

d) A conduit/nozzle/splash plate combination (c) wherein the internal baffling means comprise a plurality of substantially uniformly-sized tubes within and parallel to the conduit and spaced from the splash plate; and e) A method of and apparatus for producing a water screen which is useful for the back projection of moving or still light images and which comprises dispersing or means for dispersing non-turbulent water under high pressure radially from a central source over an angle of 180 degrees.

Throughout the disclosure and claims the words "substantial" and "substantially" are used to permit only that variation which does not affect the results sought to be accomplished.

The ensuing description taken in conjunction with the drawings is given by way of non-limiting example and is intended to facilitate understanding of how the invention can be attained.

BRIEF DESCRIPTION OF THE DRAWINGS

FIG. 1 is a diagram illustrating the principle of an apparatus for projecting water according to the invention;

FIG. 2, on a smaller scale, shows the configuration of a screen obtained with the apparatus of the invention;

FIG. 3 is a rear view of the apparatus for projecting water in a concrete exemplary embodiment;

FIG. 4 is a view from above of the apparatus of FIG. 3;

FIG. 5 is a detailed view, on a larger scale, of the apparatus of FIG. 3 seen from the side; and FIG. 6 is a detail view of FIG. 5, seen from above.

FIG. 7 is a detailed view of one form of baffles within nozzle 16.

DETAILS

The apparatus shown schematically in FIG. 1 is an apparatus for projecting water under pressure to form a screen 1, constituted by transparent droplets 2 that are capable of reflecting rays of light 3 that strike the screen after being emitted by a back-projection apparatus 4, thus making the screen into a receiver of moving or still images that can be seen from a viewing point 5.

A preferred embodiment of the apparatus according to the invention includes a stabilizer base 6, on which a vertical dispersal plate 7 is solidly disposed; this plate is located on the trajectory of the water driven by way of a high-pressure pump 8, in this case a turbocompressor, in a horizontal conduit 9 that is perpendicular to the dispersal plate 7. The end of the conduit 9 is mechanically joined to the plate 7 and with it defines an upper opening 10 constituting an outlet for a sheet of water directed vertically to constitute the screen 1.

The conduit 9 is also supported by the stabilizer base 6, as is the turbocompressor 8, so as to constitute a ballast weight that increases the stability of the overall apparatus.

The stabilizer base 6 is composed of a frame 11 (FIG. 4) resting horizontally flat on the ground and formed by lateral and longitudinal tubes 12 and 13, respectively, of square cross section. Two grooves 14 are made on the lateral edges 12 of frame 11, so that the dispersal plate 7 can be perpendicularly held there.

The dispersal plate 7 is also reinforced, with respect to the frame 11, by ribs 15 disposed between the dispersal plate 7, on its side 7a opposite the side 7b receiving the splash of water, and a longitudinal edge 13 of the frame 11 of the stabilizer base 6.

The upper opening 10 is obtained by removal of partly acted-upon material at the end of the conduit 9 between the dispersal plate 7 and conduit 9.

In the present exemplary embodiment, at the end of conduit 9 is an attached cylindrical nozzle 16, in the upper portion of which is an oblique notch 17 (FIG. 5) of semicircular contour, made on the periphery of this nozzle 16. The oblique notch 17 forms an open angle of 3° with respect to the lower portion 7c of the dispersal plate 7 with which the nozzle 16 is mechanically joined in a sealed manner, for example by a welding bead.

The upper opening 10 thus made makes it possible to obtain a screen 1 constituted of droplets projected in the directions A, B, C, D, E (FIG. 2), encompassing an angle of 180°.

The dimentional and structural definition of the screen 1 is controlled by the shape of the upper opening 10 and by the throughput and pressure of the high-pressure pump.

Test have shown that with a supply of water along F of 180 cubic meters per hour at 12 bars of pressure, and with a conduit having an internal diameter of approximately 110 millimeters, and with a nozzle as described above, a substantially semicircular screen 1 is obtained that is 18 meters in height "H" and 45 meters in width "1" and has a mean thickness of 10 cm, with excellent rigidity and consequently good surface flatness.

Figure 7:
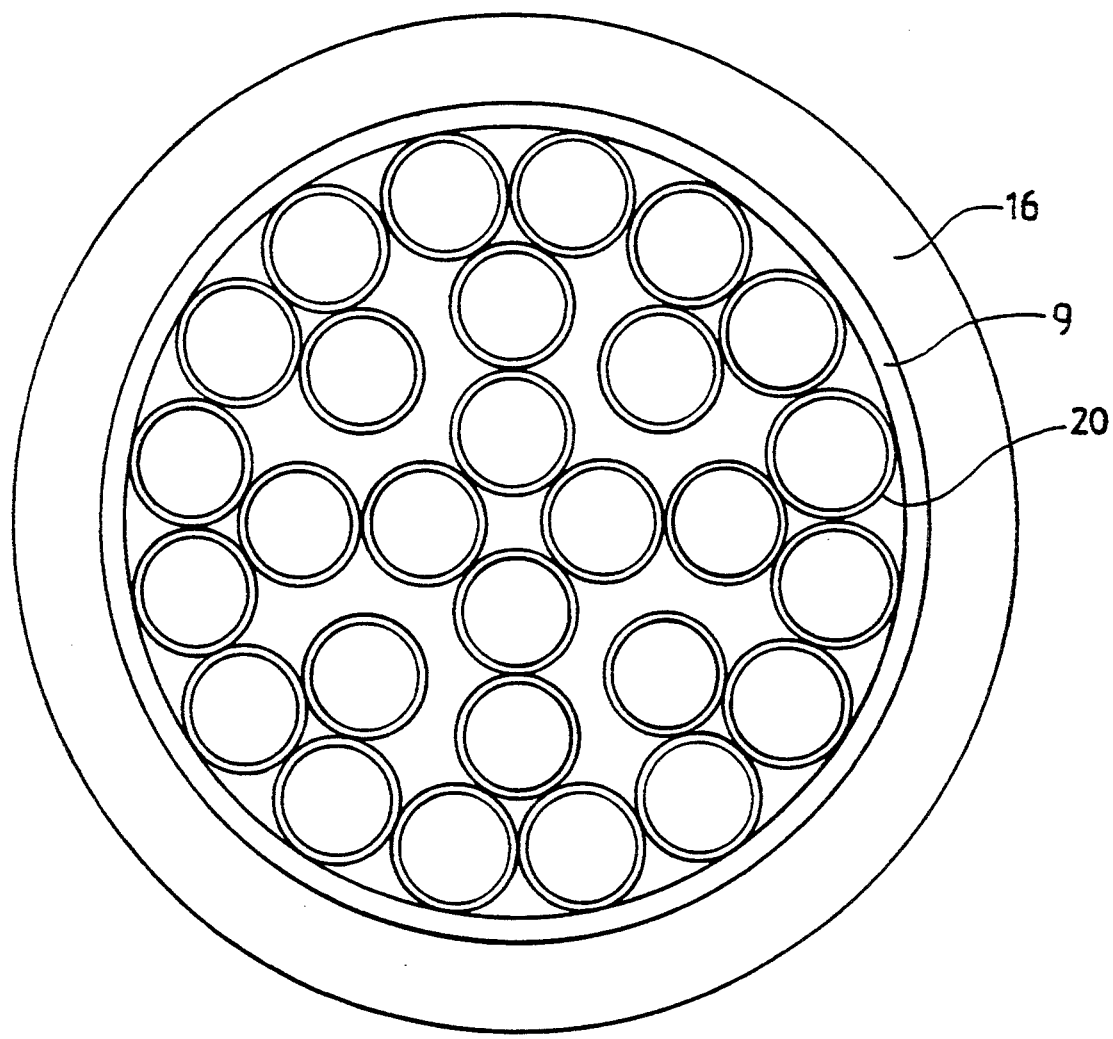

The internal diameter of horizontal conduit 9 varies with the dimensions of screen 1 to be produced. Such diameter is normally somewhere from 3 to 8 inches (76 to 202 mm). Water pumped through a nozzle of such size is extremely turbulent (swirling) and unsuitable for producing a water screen in the form of a film of water suitable for the contemplated type of back projection of light images. In order to obtain highly-desirable film uniformity, the water passing through conduit 9 must be suitably baffled to counteract turbulence otherwise present. One suitable way of baffling the water in conduit 9 is to insert a plurality of tubes therein. For a four-inch (110 mm) diameter conduit, the number of inserted tubes can vary, e.g., from about 25 to about 35; 28 tubes is preferred in this size conduit. An arrangement of 28 tubes 20 within conduit 9 is illustrated in FIG. 7.

The actual size of produced water screen varies over a considerable range, e.g., from about 6 to about 34 meters in height. A number of the involved parameters must naturally be varied appropriately to produce different water screen sizes. The following table illustrates suitable dimensions, structure and conditions for four significantly different water screen sizes.

The fixation of the conduit 9 and nozzle 16 to the base 6, and of the dispersal plate 7 as well, is done on the one hand by way of a tappet 18 serving as a brace between the lower portion of the conduit 9 and a longitudinal edge 13 of the frame 11 of the base 6, and on the other by screws and nuts 19 engaging the thickness of the nozzle 16, in its lower portion opposite the opening 10 and on its lateral edges immediately under this opening 10.

The invention and its advantages are readily understood from the foregoing description. Various changes may be made in the process and apparatus without departing from the spirit and scope of the invention or sacrificing its material advantages. The process and apparatus hereinbefore described are merely illustrative of preferred embodiments of the invention.

What is claimed is:

1. A combination of a projector of moving or still images and an apparatus for projecting water under pressure to form a screen, made up of transparent droplets that are capable of reflecting light rays striking the screen by back-projection from the projector, thus making the screen a receiver of the moving or still images, which apparatus includes a substantially vertical dispersal plate that is disposed on the trajectory of the water driven by way of a high-pressure pump in a substantially horizontal cylindrical conduit, an end of which, being mechanically joined to said dispersal plate, defines with said plate an upper opening constituting an outlet for a vertically oriented sheet of water.

2. A combination of claim 1, wherein dimensional and structural definition of the screen is controlled by the shape of the upper opening and by the throughput and pressure of the high-pressure pump.

3. A combination of claim 2, wherein the upper opening is obtained by removal of partially acted-upon material at the end of the conduit between the dispersal plate and said conduit.

4. A combination of claim 2, wherein the high-pressure pump is a turbocompressor.

|  | WATER SCREEN | | | |
|---|---|---|---|---|
|  | (a) | (b) | (c) | (d) |
| WATER SCREEN (1) Height & Width | 8 m × 20 m | 12 m × 30 m | 15 m × 38 m | 18 m × 45 m |
| MAIN CONDUIT (9) - Length | 1250 mm | 1750 mm | 1750 mm | 1750 mm |
| MAIN CONDUIT (9) - Diameter | 4 inches | 4 inches | 4 inches | 6 inches |
| DEFLECTOR PLATE (7) - Size | 255 mm × 505 mm | 255 mm × 505 mm | 300 mm × 600 mm | 300 mm × 600 mm |
| Distance Between CONDUIT and DEFLECTOR PLATE | 7 mm | 9 mm | 11 mm | 17 mm |
| Internal Small CONDUCTING PIPE (20) - Diameter | ½ inch | ½ inch | 1 inch | 1 inch |
| Internal Small CONDUCTING PIPE (20) - Quantity | 28 | 28 | 7 | 17 |
| WATER SUPPLY Requirement | 420 gal/min | 617 gal/min | 793 gal/min | 1410 gal/min |
| WATER PRESSURE Requirement | 140 P.S.I. | 174 P.S.I. | 174 P.S.I. | 195 P.S.I. | m = meter
mm = millimeter
gal = gallon
min = minute
P.S.I. = Pounds per Square Inch 5. A combination of claim 1, wherein the upper opening is semicircular in contour, made on the periphery of the cylindrical conduit for obtaining the screen made up of droplets projected in directions (A, B, C, D, E) covering an angle of 180°.

6. A combination of claim 5, wherein at the end of the conduit is a cylindrical nozzle that is notched along a plane radial to its upper portion and is mechanically joined in a sealed manner to the dispersal plate in its lower portion.

7. A combination of claim 5, wherein at the end of the conduit is a cylindrical nozzle that is notched along a plane oblique to its upper portion to form an open angle with respect to a lower portion of the dispersal plate to which said nozzle is mechanically joined in a sealed manner in the lower portion.

8. A combination of claim 7, wherein the cylindrical nozzle is connected to the end of the conduit.

9. A combination of claim 1, wherein the dispersal plate and the conduit are disposed solidly joined to a stabilizer base.

10. A combination of claim 9, wherein the stabilizer base is composed of a horizontally-disposed frame between two lateral edges of which the dispersal plate is fixed, substantially perpendicularly.

11. A combination of claim 10, wherein reinforcement ribs are disposed at right angles between the dispersal plate, on a side opposite that impinged upon by water, and a longitudinal edge of the frame of the stabilizer base.

12. A combination of claim 11, which comprises means to obtain a substantially semicircular screen 18 meters in height and 36 meters in width.

13. A light-ray image projection water screen which is suitable for receiving well-defined back-projected light images, which substantialy stable, which is thin, and which has surface, thickness and density regularity sufficient to assure that the back-projected light images thereon are well defined.

14. A water screen of claim 13 which is composed of transparent droplets of water projected radially from a central source over and arc of 180° from said source.

15. A water screen of claim 13 in combination with a substantially vertical dispersal plate against which the water is projected prior to being dispersed radially to form the screen.

16. A method of producing a water screen of claim 13 which is useful for reflecting moving or still images projected thereon, the method comprising dispersing substantially non-turbulent water under high pressure radially from a central source over an angle of 180°.

17. Apparatus for projecting water under pressure to form a screen, made up of transparent droplets that are capable of reflecting light rays striking the screen by back-projection, thus making the screen a receiver of well-defined moving or still images;
   which apparatus includes a substantially horizontal cylindrical conduit, a nozzle and a substantially vertical dispersal or splash plate that is disposed on the trajectory of water driven by way of a high-pressure pump in the substantially horizontal cylindrical conduit through the nozzle, which comprises internal baffle means to counteract turbulence of high-pressure water transmitted therethrough.

18. Apparatus of claim 17 wherein the baffle means comprise a plurality of substantially uniformly sized tubes parallel to the nozzle.

19. A method which comprises back-projecting moving or still images on a water screen and which comprises forming the water screen by dispersing water under high pressure radially from a central source in a manner which permits resulting back-projected images to be well defined.

20. A method of claim 19 wherein the water screen is substantially stable and has surface, thickness and density regularity.

21. A method of claim 19 wherein the water screen is substantially semicircular in shape, and has excellent rigidity and good surface flatness.

* * * * *